United States Patent [19]

Fleming et al.

[11] 4,352,827
[45] Oct. 5, 1982

[54] ALTERED BRINING PROPERTIES OF PRODUCE BY A METHOD OF PRE-BRINING EXPOSURE OF THE FRESH PRODUCE TO OXYGEN OR CARBON DIOXIDE

[75] Inventors: Henry P. Fleming; David M. Pharr; Roger L. Thompson, all of Raleigh, N.C.

[73] Assignee: The United States of America as represented by the Secretary of Agriculture, Washington, D.C.

[21] Appl. No.: 314,323

[22] Filed: Oct. 23, 1981

[51] Int. Cl.³ .............................................. A23L 1/218
[52] U.S. Cl. .................................... 426/270; 426/49; 426/281; 426/321; 426/615; 426/312; 426/486
[58] Field of Search ................. 426/281, 49, 270, 321, 426/615, 486, 312; 99/535

[56] References Cited

U.S. PATENT DOCUMENTS

3,403,032  9/1968  Etchells et al. .
3,480,448  11/1969  Etchells et al. .
3,932,674  1/1976  Etchells et al. ........................ 426/52

OTHER PUBLICATIONS

Fleming, H. P., and D. M. Pharr; Mechanism for Bloater Formation in Brined Cucumbers; Journal of Food Science, vol. 45, pp. 1595-1600; (1980) Nov.-Dec. 1980.

Fleming, H. P., Pharr, D. M., R. L. Thompson; Brining Properties of Cucumbers Exposed to Pure Oxygen Before Brining; Journal of Food Science, vol. 45(6):1578-1582 (1980) Nov.-Dec. 1980.

Etchells, J. L., Bell, T. A., Fleming, H. P., Kelling, R. E., R. L. Thompson; Pickle Pack Science, pp. 4-14 vol. 3 (1973) Suggested Procedure of the Controlled Fermentation of Commercially Brined Pickling Cucumbers—The Use of Starter Cultures and Reduction of Carbon Dioxide Accumulation.

Hoover, M. W. and N. C. Miller; Factors Influencing Impregnation of Apple Slices and Development of a Continuous Process; Journal of Food Science; vol. 40 (1975).

Vaughn, Reese H., Lactic Acid Fermentation of Cucumbers, Sauerkraut and Olives; Industrial Fermentation, vol. 19, 1954.

Pederson, C. S. and Margaret N. Albury; The Sauerkraut Fermentation; Bulletin 824, New York State Agricultural Experiment Station Geneva, Cornell University (Dec. 1969).

Etchells, J. L., Fleming, H. P. and T. A. Bell; Factors Influencing the Growth of Lactic Acid Bacteria During the Fermentation of Brined Cucumbers, Paper No. 4207, Journal Series, North Carolina Agricultural Experiment Station, Raleigh, NC.

Fleming, H. P., Etchells, J. L., Thompson, R. L. and T. A. Bell, Purging of $CO_2$ From Cucumber Brines To Reduce Bloater Damage, Journal of Food Science; vol. 40 (1975).

Costilow, R. N., Bedfore, C. L., Mingus, David & David Black; Purging of Natural Salt-Stock Pickle Fermentations To Reduce Bloater Damage; Journal of Food Science; vol. 42 (1977).

*Primary Examiner*—Steven L. Weinstein
*Attorney, Agent, or Firm*—M. Howard Silverstein; David G. McConnell; Raymond C. Von Bodungen

[57] ABSTRACT

Fresh whole produce is placed in a container and continuously purged for about 30 to 120 minutes with oxygen or carbon dioxide gas. The container is then filled with a brine solution and the produce allowed to stand for a period of about 2-24 hours, thus resulting in superior pickled produce.

5 Claims, 4 Drawing Figures

Jar-reservoir assembly used to expose cucumbers to gases prior to brining and to subsequently brine the cucumbers.

Jar-reservoir assembly used to expose cucumbers to gases prior to brining and to subsequently brine the cucumbers.

Internal gas composition of fresh cucumbers exposed to $O_2$ in 1-gal jars.

Brine uptake by $O_2$ exchanged and untreated cucumbers of four sizes. The $O_2$ exchanged cucumbers had been exposed to $O_2$ at 50 ml/min/gal cucumbers for 1 hr before brining.

Effect of $O_2$ exchange in cucumbers upon density of the brined cucumbers. Densities (d) were determined after the cucumbers had been in brine for 24 hr. at 25° C.

ALTERED BRINING PROPERTIES OF PRODUCE BY A METHOD OF PRE-BRINING EXPOSURE OF THE FRESH PRODUCE TO OXYGEN OR CARBON DIOXIDE

BACKGROUND OF THE INVENTION (1) Field of the Invention

This invention relates to a unique process for the preservation of fresh produce.

(2) Description of the Prior Art

Pickling cucumbers, peppers, and certain other produce have been stored and safely preserved in sodium chloride solutions for many years. The brined produce may or may not undergo microbial fermentation depending upon the concentration of sodium chloride (salt) and the addition of other preservatives. Furthermore, if the produce is allowed to ferment, the fermentation may occur as a consequence of growth by the natural microorganisms that are present in the produce-brine mass or by addition of selected microorganisms. The general procedure for the preservation of fruits and vegetables by brining is accounted for in the reports of Vaughn et al., 1954, Pederson, 1969, and Etchells et al., 1975. Procedures have been described for the pure culture fermentation of cucumbers (U.S. Pat. No. 3,403,032) and olives (U.S. Pat. No. 3,480,448). More recently, a procedure was described for the controlled fermentation of commercially brined pickling cucumbers, which included the use of starter cultures of lactic acid bacteria, and the removal of carbon dioxide from the fermenting brine by purging of the brine with nitrogen gas so as to prevent gaseous spoilage of the cucumbers (Etchells et al., 1973; U.S. Pat. No. 3,932,674). Air purging has also been shown to be effective in removal of carbon dioxide (Fleming et al., 1975; Costilow et al., 1977). In all of the aforementioned procedures, however, the vegetables remain visually uncured in the internal flesh, and are highly buoyant in the brine solution for several weeks or longer. Uncured appearance and buoyancy are attributed to the presence of undissolved gases which remain within the flesh until sufficient time passes for the gases to diffuse from the tissue and be replaced with liquid from the flesh or from the surrounding brine.

One problem associated with the above procedures is that the brines must be purged (if the product is fermented) with a lowly soluble gas such as nitrogen or air to remove the carbon dioxide from the brine so as to prevent bloater damage (hollowness inside the vegetable). The purging rate must be sufficient to control the dissolved carbon dioxide below the critical concentration for bloater formation. A second problem is the slow development of a cured appearance in the flesh which is one cause for delay in removal of vegetables from the brine solution so that they may be further processed. If the vegetables are removed before the acquisition of the desired appearance, the cucumbers may require mild heating to drive gasses from the tissue and thereby gain the desired cured appearance. A third problem associated with the above procedures is the great buoyancy that the cucumbers retain for extended periods of time while in the brine. This increased buoyancy causes the cucumbers to be physically damaged, especially those near the top of the cucumber-brine mass. Heading timbers of sufficient strength are required to keep the vegetables submerged in the brine. The depth at which vegetables may be brined without severe physical damage is limited by the byoyancy of the vegetables during brine storage.

Vacuum impregnation has been used for many years in the firming and processing of apple slices. The procedure involves placing freshly prepared apple slices under a vacuum of 14–29 inches of mercury, followed by addition of steam or an aqueous solution containing various chemicals to be impregnated into the tissue (Hoover and Miller, 1975). The vacuum created within the intercellular spaces of the tissues causes the solution to be drawn into the flesh. The procedure presents difficulties when whole fruits, such as cucumbers, are evacuated in this manner. It is difficult to achieve a proper vacuum without causing physical disruption of the internal structures, particularly the carpel sutures, of whole pickling cucumbers. Also, infusion of liquid into the tissue by vacuum is diminished with whole fruit or thick slices, making it desirable to slice the fruit before the vacuum treatment.

SUMMARY OF THE INVENTION

In the present invention, pickling cucumbers, peppers, and certain other produce are exposed to pure oxygen or carbon dioxide in a container for sufficient time for the added oxygen or carbon dioxide to displace undissolved gases within the flesh of the produce. Then, without allowing the produce to be exposed to air, an aqueous solution is added to the container until the produce is entirely submerged in the solution. The produce is held in the solution until the desired physical changes occur or it is removed for further processing.

The main object of the invention is to provide a method for attaining a greater resistance to carbon dioxide during brine storage if the produce is fermented, a rapid visual cure, and a rapid increase in the density of the produce.

Produce treated by pre-brining exposure to oxygen or carbon dioxide can be used more quickly when visual cure is a prerequisite for removal from brine storage, and the produce may be stored with less physical damage because they are less buoyant and are more resistant to bloater damage by carbon dioxide.

DESCRIPTION OF THE PREFERRED EMBODIMENTS

Figure 1:
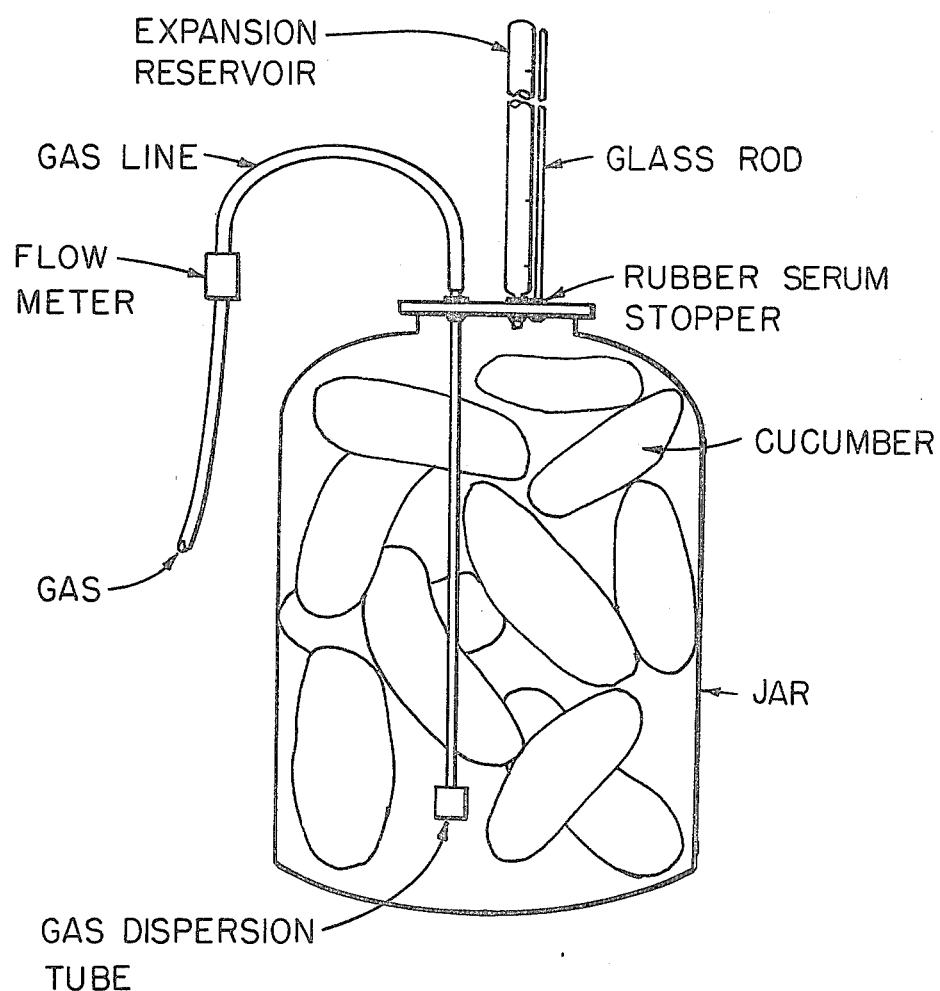
FIG. 1 represents a jar-reservoir assembly used to expose cucumbers to gases prior to brining and to subsequently brine the cucumbers.

Cucumbers, peppers, and certain other fruits and vegetables are placed in a suitably sized, non-porous container. The container is capped in some manner to allow containment of introduced oxygen or carbon dioxide gas and a minimum possibility for re-entrance of air. Oxygen or carbon dioxide is introduced into the container until the internal gases of the produce have been displaced with the added oxygen (oxygen-exchanged) or carbon dioxide (carbon dioxide-exchanged). The gas exchange can be accomplished within a few minutes up to an hour or longer. The degree of gas exchange can be varied to effect the physical properties of the final product. The gas may be introduced intermittently or continuously, but it is important that air not be allowed to re-enter the container during this period. Containment of oxygen or carbon dioxide with a minimum of air entrance can be accomplished by minimizing the diameter of the gas exit port, such that a suitable flow of gas can be maintained with free exit through this port and with a gas pressure slightly exceeding that of the atmosphere. After the produce has been gas exchanged an aqueous solution containing salts (for example, sodium chloride and calcium chloride), acids, or other soluble amendments is added to cover the produce. After the produce is completely submerged and the solution has displaced the gas space surrounding the produce, the gas flow may be discontinued. Alternatively, a continuous system may be used whereby the produce is conveyed through a system where it is first exposed to oxygen or carbon dioxide for a sufficient period, followed by submergence in the desired solution. After solution addition, the solution and produce are held until sufficient time for the desired physical changes related to appearance and density to take place. This time required varies with the particular fruit or vegetable, the size of the vegetable, temperature, and other chemical and physical factors. For pickling cucumbers held at 27° C., for example, curing starts to become obvious within an hour, and is essentially complete within a day.

Oxygen replacement of the gases within fresh pickling cucumbers apparently lowers the gas pressure inside the cucumbers when they are placed in brine, and thereby, causes liquid to be taken into the tissue. We think that oxygen is quickly converted to carbon dioxide by respiratory activity within the cucumbers when the fruit is brined. As oxygen is metabolized to carbon dioxide, the resulting gas pressure due to carbon dioxide is less than that formerly due to oxygen because of the greater solubility of carbon dioxide. Carbon dioxide dissolves in tissue fluids much more than oxygen does. The lowered gas pressure inside the cucumbers causes brine to move into the cucumbers, and/or causes the cucumbers to shrivel, thus accounting for a drop in the brine level.

We attribute the rapid appearance of cure in oxygen-exchanged cucumbers to the rapid uptake of brine and its replacement of gas inside the fruit. The white opaqueness of fresh cucumbers has been attributed to the presence of gas within the tissue. Brined cucumbers normally acquire a cured appearance gradually over a period of months. In unexchanged, brined cucumbers, nitrogen is the primary internal gas, and its displacement from the interior of the fruit apparently is slow, at least partly because of its low solubility.

The reduced susceptibility of oxygen-exchanged cucumbers to bloater damage is probably due to the removal of nitrogen from the interior of the fruit, and to brine filling the intercellular gas spaces. In unexchanged cucumbers, nitrogen, because it is less water soluble than carbon dioxide, diffuses out of the brined fruit slower than carbon dioxide diffuses in from the fermenting brine; hence, the internal gas pressure of the fruit, due to the combined partial pressures of nitrogen and carbon dioxide, increases. Brine uptake by oxygen-exchanged cucumbers eliminates intercellular gas spaces that probably serve as nuclei for bloater formation.

Carbon dioxide replacement of the gases within cucumbers apparently is effective in reducing susceptibility of the cucumbers to bloater damage by removal of the lowly soluble nitrogen from the cucumber tissue.

Alteration in the brining properties of oxygen-exchanged and carbon dioxide-exchanged cucumbers may offer several practical advantages. Greater tolerance of oxygen- and carbon dioxide-exchanged cucumbers to brine carbon dioxide would lower purging costs, since less nitrogen would be required to maintain carbon dioxide at levels higher than those currently suggested.

The rapid appearance of cure in oxygen-exchanged cucumbers may be of importance in certain applications. For example, some picklers state that their customers insist upon hamburger dill chips that appear fully cured. Also, there is desire for visual cure in whole genuine dill pickles.

Cucumbers are buoyant (density=about 0.96) when first brined, due largely to the gas trapped inside the fruit and to the high salt level of the cover brine. Fresh cucumbers may be placed in brines of up to 40° salometer (density, 1.076) commercially. Buoyancy causes the fruit to be forced upward against the headboards, which are inserted into the brining tank to keep the cucumbers submerged. This buoyancy pressure can cause physical damage to the cucumbers, particularly those in the upper levels of the tank. It is possible to increase the density and thereby reduce the buoyancy of cucumbers rapidly by first treating them with oxygen. The uptake of brine increases the density of the cucumbers, and thereby, reduced buoyancy of the fruit during early stages of brine storage.

The oxygen exchange procedure described herein does not offer the disadvantages of physical disruption of the tissue and requirement for reduced particle size associated with mechanical vacuum treatments. The vacuum created by the oxygen treatment initiates within the tissue and is regulated by metabolism of the fruit itself. Thus, carpel separation and other internal disruptions do not occur as when the vacuum is created external to the cucumbers or other produce. Also, the oxygen exchange procedure can be used with whole produce such as cucumbers without need for size reduction such as slicing.

EXAMPLE 1

Figure 2:
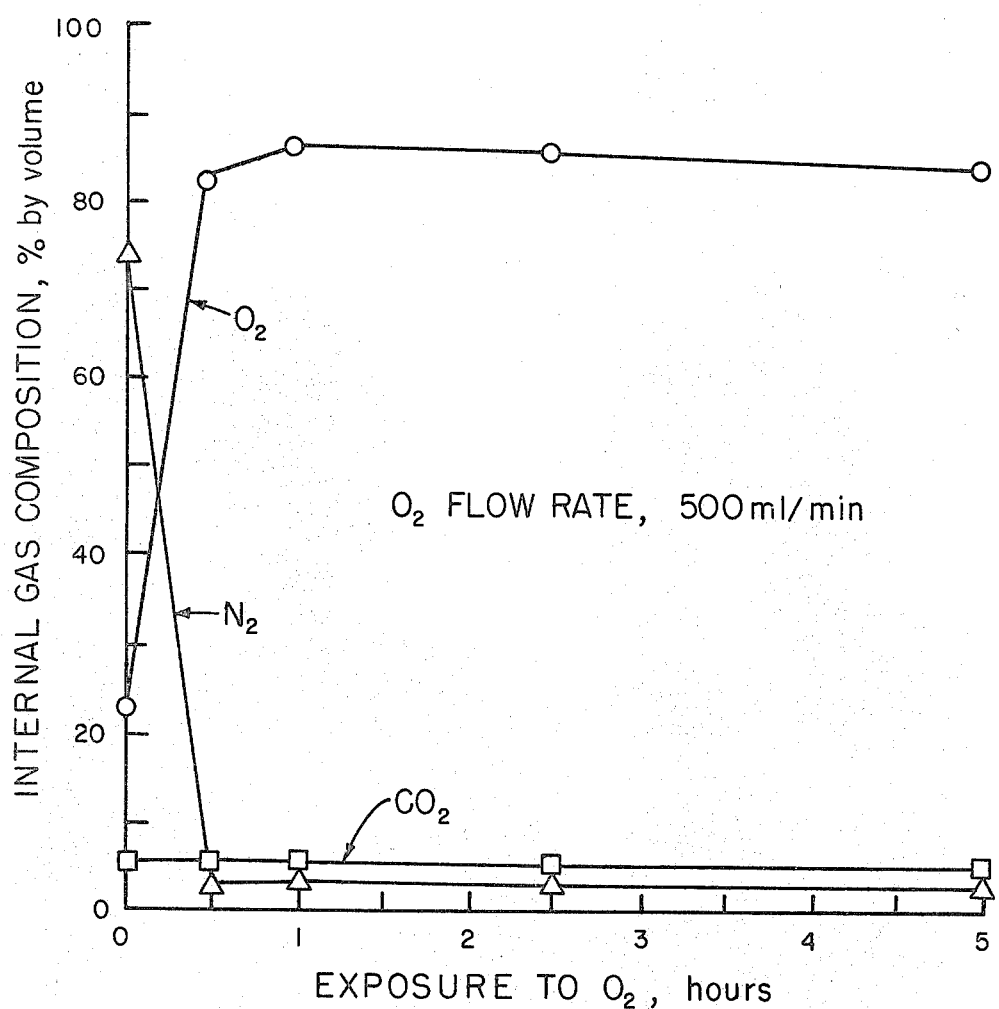
FIG. 2 represents a graph of internal gas composition of fresh cucumbers exposed to $O_2$ in 1-gallon jars.
Figure 3:
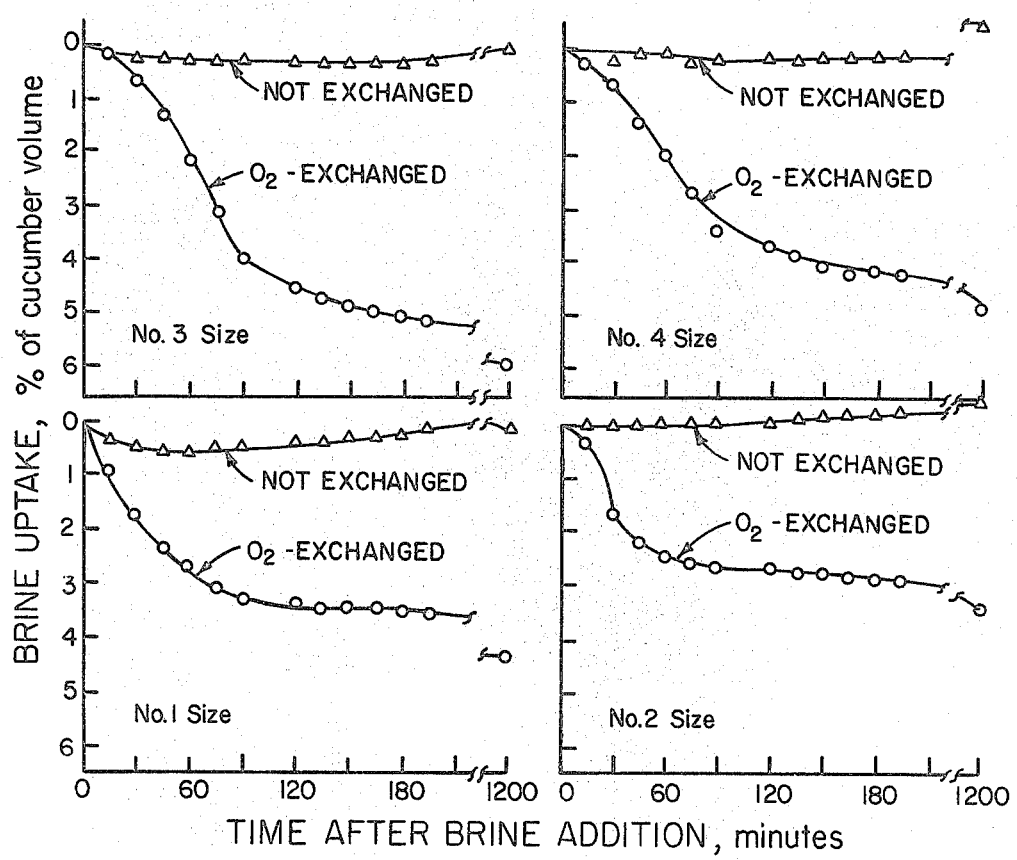
FIG. 3 represents graphs of brine uptake by $O_2$ exchanged and untreated cucumbers of four sizes. The $O_2$ exchanged cucumbers had been exposed to $O_2$ at 50 ml./min./gal. cucumbers for 1 hour before brining.

Fresh pickling cucumbers (1.9 kg) were packed into 1-gallon glass jars and the jars were capped with a special assembly as shown in FIG. 1. The cap assembly was designed to permit entrance and exit of gases, and contained a reservoir through which liquid solutions were introduced after gas had been purged for desired periods. Either oxygen, carbon dioxide or nitrogen was used to continuously purge the jars at a flow rate of 50 to 500 ml/minute or for specified times which varied from 15 minutes to 5 hours. The internal gas composition of the cucumbers changed as they were exposed to the gases as shown in FIG. 2 and Table 1. After desired exposure of the cucumbers to the specified gas, a brine solution containing sodium chloride (9.8 or 10.6%, w/v), glacial acetic acid (0.32%, v/v), and sodium benzoate (0.2% w/v) was added through the reservoir up to the 200-ml mark in the reservoir of the cap assembly shown in FIG. 1. When oxygen was the purging gas, the brine level receded in the reservoir, as shown in FIG. 3. The brine level receded only slightly when no gas was introduced into the jars. After the cucumbers had been in the brine for about 2 to 24 hours, they were cut in half longitudinally and were observed.

Oxygen-treated cucumbers appeared translucent and thus similar to fully cured brine-stock pickles, after 24 hours in brine. Carbon dioxide-treated cucumbers were partially translucent; but nitrogen-treated and air-treated (control, no gas added) cucumbers appeared white and opaque, which is similar to the appearance of raw uncured cucumbers.

The gas-treated and brined cucumbers in other lots were tested for susceptibility to bloater damage by bubbling carbon dioxide through the solution with the gas dispersion tube shown in FIG. 1. Cucumbers that had been exposed to carbon dioxide or oxygen bloated only slightly, while cucumbers that had not been exposed to these gases (control) bloated severely as shown in Table 1.

TABLE I

Effects of Exchange Gas on Internal Gas Composition of Cucumbers Prior to Brining and on Bloater Damage Upon Subsequent Carbonation of the Brined Cucumbers

| Exchange Gas | Internal gas comp.[a] (%) | | | Bloater damage after carbonation | |
|---|---|---|---|---|---|
| | $CO_2$ | $O_2$ | $N_2$ | Max expansion volume (%) | Bloater Index |
| None | 8.9 | 21.9 | 74.1 | 9.2 | 20.0 |
| $CO_2$ | 101.5 | 0.9 | 2.4 | 4.5 | 3.0 |
| $O_2$ | 5.0 | 86.4 | 4.0 | 3.2 | 6.2 |
| LSD 0.05 | | | | 1.6 | 9.2 |

[a]Cucumbers exposed to exchange gas, 500 ml/min, for 1 hr before internal gas composition was analyzed.

EXAMPLE 2

Fresh pickling cucumbers were packed into 1-gallon glass jars and the jars were capped with a special assembly as shown in FIG. 1. Oxygen was used to purge the jars intermittently at a flow rate of 500 ml/minute with gasing occurring for 6 minutes, followed by 15-minute intervals of no gasing. After the specified number of purges which included 0 to 4 purges, a brine solution containing sodium chloride (10.6% w/v), glacial acetic acid (0.32%, v/v), and either sodium benzoate (0.02%, w/v) or no sodium benzoate was added through the reservoir up to the 200 ml mark. Brined cucumbers to which no sodium benzoate had been added were buffered with sodium acetate.3H$_2$O (0.5%), and inoculated with *Lactobacillus plantarum* (1 billion cells/gallon jar). After incubation of the chambers for 7 days, during which time the cucumbers were fermented by the bacteria, the oxygen-exposed cucumbers were only slightly bloated, while those not exposed to oxygen were severely bloated as shown in Table 2. Other lots of oxygen-treated cucumbers gave visible evidence of being 92 to 100% cured after only 4 days and 100% cured after 90 days of brine storage in both fermented (no sodium benzoate added) and not fermented (sodium benzoate added) cucumbers as shown in Table 3. In contrast, cucumbers that had not been exposed to oxygen before brining were only 2 to 5% visually cured after 4 days and only 65 to 80% visually cured after 90 days as shown in Table 3.

TABLE II

Effect of $O_2$ Exchange in Fresh Cucumbers on Bloater Damage and Fermentation of the Brined Cucumbers[a]

| Intermittent $O_2$ exposures[a] | Bloater index | Expansion volume (%) | Brine Analyses[b] | | |
|---|---|---|---|---|---|
| | | | pH | Acid (%) | $CO_2$ (mg/100 ml brine) |
| 0 | 20.2 | 6.8 | 3.55 | 0.74 | 66.4 |
| 2 | 9.5 | 2.4 | 3.57 | 0.76 | 75.3 |
| 4 | 1.5 | 1.1 | 3.64 | 0.70 | 74.4 |
| LSD 0.05 | 12.3 | 3.8 | 0.18 | 0.11 | 13.0 |

[a]$O_2$ at 500 ml/min for 6 min per exposure. $O_2$ added two or four times, intermittently, with 15-min intervals between additions.
[b]Determined after fermentation for 7 days.

TABLE III

Effect of $O_2$ Exchange in Fresh Cucumbers on Physical Properties of the Brined Cucumbers[a]

| No. of Intermittent $O_2$ Exposures[b] | Days of brine Storage | Soft Centers (%) | Pressure test (lb) | Cure (%) |
|---|---|---|---|---|
| Fermented | | | | |
| 0 | 4 | 4 | 16.7 | 2 |
| | 14 | 0 | 18.0 | 30 |
| | 90 | 15 | 18.2 | 80 |
| 2 | 4 | 0 | 16.8 | 92 |
| | 14 | 4 | 17.9 | 96 |
| | 90 | 4 | 17.9 | 100 |
| 4 | 4 | 4 | 17.4 | 100 |
| | 14 | 4 | 17.9 | 97 |
| | 90 | 19 | 18.3 | 100 |
| Not Fermented | | | | |
| 0 | 4 | 0 | 17.2 | 5 |
| | 14 | 12 | 16.4 | 12 |
| | 90 | 8 | 17.6 | 65 |
| 2 | 4 | 8 | 15.3 | 98 |
| | 14 | 27 | 17.8 | 100 |
| | 90 | 23 | 16.6 | 100 |
| 4 | 4 | 0 | 17.6 | 100 |
| | 14 | 12 | 18.6 | 100 |
| | 90 | 23 | 16.6 | 100 |

[a]Values are averages from duplicate 1-gal jars, each containing 13 no. 3 size cucumbers.
[b]See footnote [a] for Table II for explanation of intermittent exposures.

EXAMPLE 3

Figure 4:
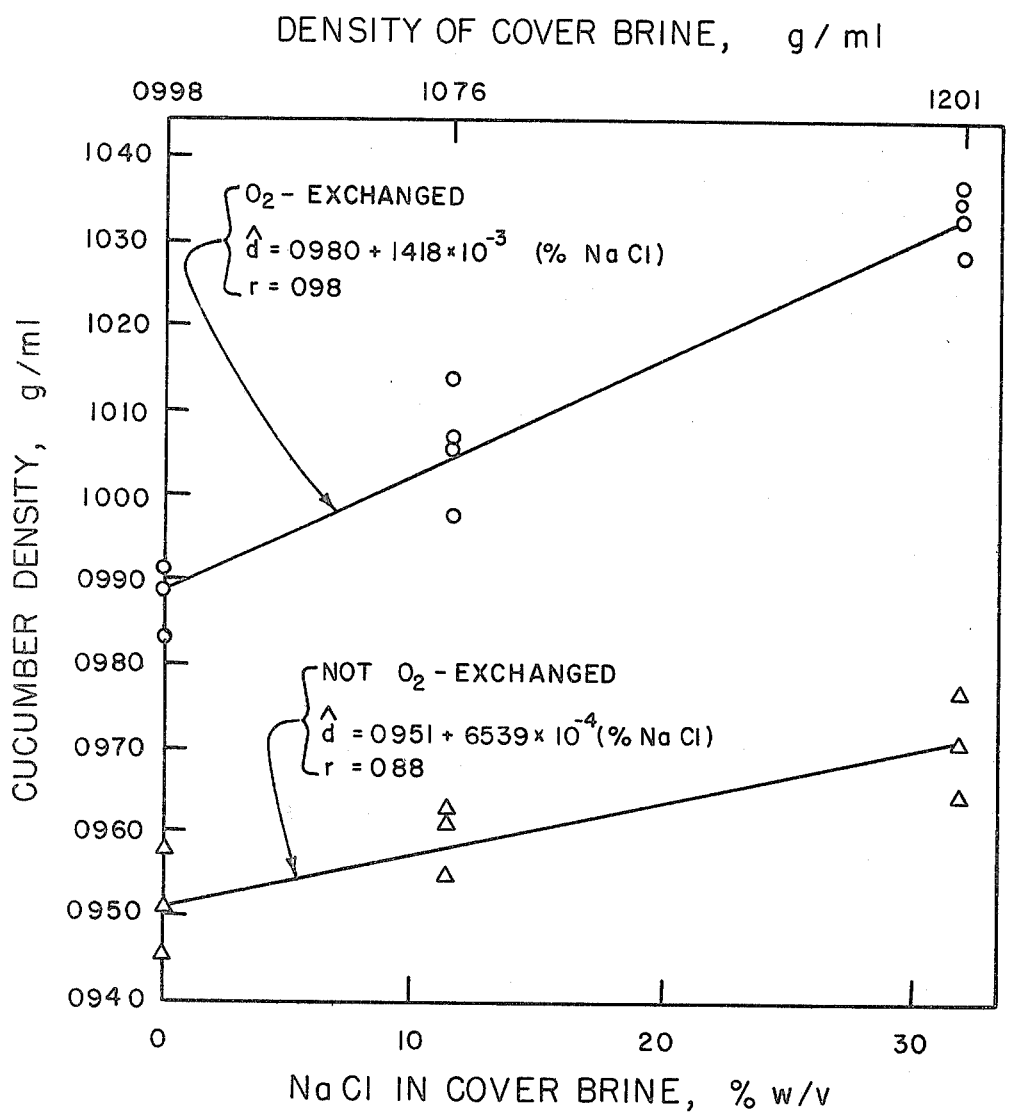
FIG. 4 represents a graph of the effect of $O_2$ exchange in cucumbers upon density of the brined cucumbers. Densities (d) were determined after the cucumbers had been in brine for 24 hours at 25° C.

Fresh pickling cucumbers were packed into 1-gallon glass jars and the jars were capped with a special assembly as shown in FIG. 1. In one lot of jars, oxygen was used to continuously purge the jars at a flow rate of 500 ml/minute for 1 hour. In another lot of jars, no oxygen was introduced. After oxygen treatment, solutions containing sodium chloride (at specified concentrations as shown in FIG. 4), glacial acetic acid (10.6%, w/v), and sodium benzoate (0.2%, w/v) were introduced into the jars. After 24 hours, cucumbers that had been exposed to oxygen were decidedly more dense than those that had not been exposed to oxygen as shown in FIG. 4.

EXAMPLE 4

Fresh whole produce including okra (1.3 kg) and cherry peppers (1.2 kg) were packed, by individual commodity, into 1-gallon glass jars and the jars were capped with a special assembly as shown in FIG. 1. Oxygen was used to continuously purge the jars at a flow rate of 300 to 500 ml/minute for 1 hour. Sodium chloride solution (8.3% NaCl) was introduced into the jars containing oxygen-treated produce and another set of jars containing the same types of produce which had not been oxygen treated (controls). Thereafter, the brine level began to recede. After 1 day of storage at 27°

C., the okra and peppers that received the oxygen treatment appeared visually cured in the internal flesh, the produce had absorbed liquid, and they were more dense. The produce in the control jars appeared uncured, more buoyant and did not contain free liquid.

We claim:

1. A process for pickling and altering the brining properties of fresh produce comprising:
   (a) placing fresh produce to be pickled in a container;
   (b) continuously purging the container containing said produce with pure oxygen or carbon dioxide gas for a period of time sufficient to remove air from the container and allow said oxygen or carbon dioxide to displace undissolved gases within the flesh of the produce;
   (c) then, without allowing said produce to be exposed to the air, filling the container with a brine solution until said produce is submerged;
   (d) allowing the produce to stand in the brine solution for a period of time sufficient to result in a pickled produce.

2. The process of claim 1 wherein the brine solution is sodium chloride, glacial acetic acid, and sodium benzoate.

3. The process of claim 1 wherein the continuous purge with oxygen or carbon dioxide is for a period of about 30 to 120 minutes.

4. The process of claim 1 wherein the fresh produce is allowed to stand in the brine solution for about 2 to 24 hours.

5. The process of claim 1 wherein the produce is selected from the group consisting of: cucumber, cherry peppers, and okra.

* * * * *